United States Patent [19]

Parker

[11] Patent Number: 4,728,018
[45] Date of Patent: Mar. 1, 1988

[54] BEVERAGE HOLDER FOR VEHICLE

[75] Inventor: Barry R. Parker, Lansing, Mich.

[73] Assignee: General Motors Corporation, Detroit, Mich.

[21] Appl. No.: 61,458

[22] Filed: Jun. 15, 1987

[51] Int. Cl.$^4$ ................................................. B60R 7/00
[52] U.S. Cl. ................................ 224/273; 224/42.42; 296/37.13
[58] Field of Search .................... 296/37.1, 37.8, 37.12, 296/37.13; 248/27.1; 220/85 H; 108/44, 45; 224/273, 42.45 R, 311, 42.42, 42.46 R, 148, 282

[56] References Cited

U.S. PATENT DOCUMENTS

| 2,772,934 | 12/1956 | Eraut | 224/42.45 R |
| 3,088,771 | 5/1963 | Weigle | 224/42.42 R |
| 3,132,892 | 5/1964 | Stevens | 224/42.42 R X |
| 4,535,923 | 8/1985 | Manke | 224/273 |

Primary Examiner—Henry J. Recla
Assistant Examiner—David Voorhees
Attorney, Agent, or Firm—Charles E. Leahy

[57] ABSTRACT

A beverage holder for supporting both the bottom surface and the sides of a container includes a housing mounted within a vertical panel of the vehicle body and having spaced apart side walls defining a narrow vertical slot. A plastic retainer includes a narrow spine portion having an end pivoted to the housing at the bottom of the narrow slot to mount the spine for movement between a vertical position stored inside the housing and a deployed position extending horizontally outward from the face of the panel and defining a narrow shelf for supporting the bottom surface of the container. The retainer also has a pair of plastic support wings connected to the spine and extending above the spine. The wings are yieldable relative one another to spaced apart positions by which the wings resiliently cradle the walls of the beverage container to balance the beverage container on the spine. Furthermore, the wings yield relative one another to a closely spaced relation when the retainer is pivoted through the narrow slot to the stored position. In the stored position, the wings yieldably engage the side walls of the housing to thereby retain the retainer in the stored position.

3 Claims, 4 Drawing Figures

BEVERAGE HOLDER FOR VEHICLE

The invention relates to a holder for holding a beverage container in a vehicle body and more particularly to a beverage holder which is concealed behind a narrow vertical slot in a vehicle body panel when not in use.

BACKGROUND OF THE INVENTION

Occupants of motor vehicles frequently place beverage containers such as coffee cups and soft drink cans on a horizontal surface such as the arm rest, console, or the instrument panel. However, if the vehicle corners or decelerates, the beverage container slides on the surface and may be spilled. Accordingly, it is well known to provide a circular depression on the horizontal surface to retain the beverage container against sliding movement. A disadvantage of such a circular depression is that it may be visually displeasing, especially when condensation or spillage from the container collects in the depression and becomes mixed with dust and dirt which also tend to collect in the depression.

Thus it would be desirable to provide a means for holding a beverage container on a vehicle body surface and eliminate the need for the beverage container to rest on a horizontal surface of the vehicle.

SUMMARY OF THE INVENTION

A beverage holder for supporting both the bottom surface and the sides of a container includes a housing mounted within a vertical panel of the vehicle body and having spaced apart side walls defining a narrow vertical slot. A plastic retainer includes a narrow spine portion having an end pivoted to the housing at the bottom of the narrow slot to mount the spine for movement between a vertical position stored inside the housing and a deployed position extending horizontally outward from the face of the panel and defining a narrow shelf for supporting the bottom surface of the container. The retainer also has a pair of plastic support wings connected to the spine and extending above the spine. The wings are yieldable relative one another to spaced apart positions by which the wings resiliently cradle the walls of the beverage container to balance the beverage container on the spine. Furthermore, the wings yield relative one another to a closely spaced relation when the retainer is pivoted through the narrow slot to the stored position. In the stored position, the wings yieldably engage the side walls of the housing to thereby retain the retainer in the stored position. The retainer is preferably injection molded so that the spine and wings are integral with each other, or in the alternative, may be defined by sheets of vacuum formed plastic material having edge portions bonded or otherwise attached together to provide a narrow shelf portion.

BRIEF DESCRIPTION OF THE DRAWINGS

These and other objects, features and advantages of the invention will become apparent upon consideration of the specification and appended drawings in which.

DESCRIPTION OF THE PREFERRED EMBODIMENT

Figure 1:
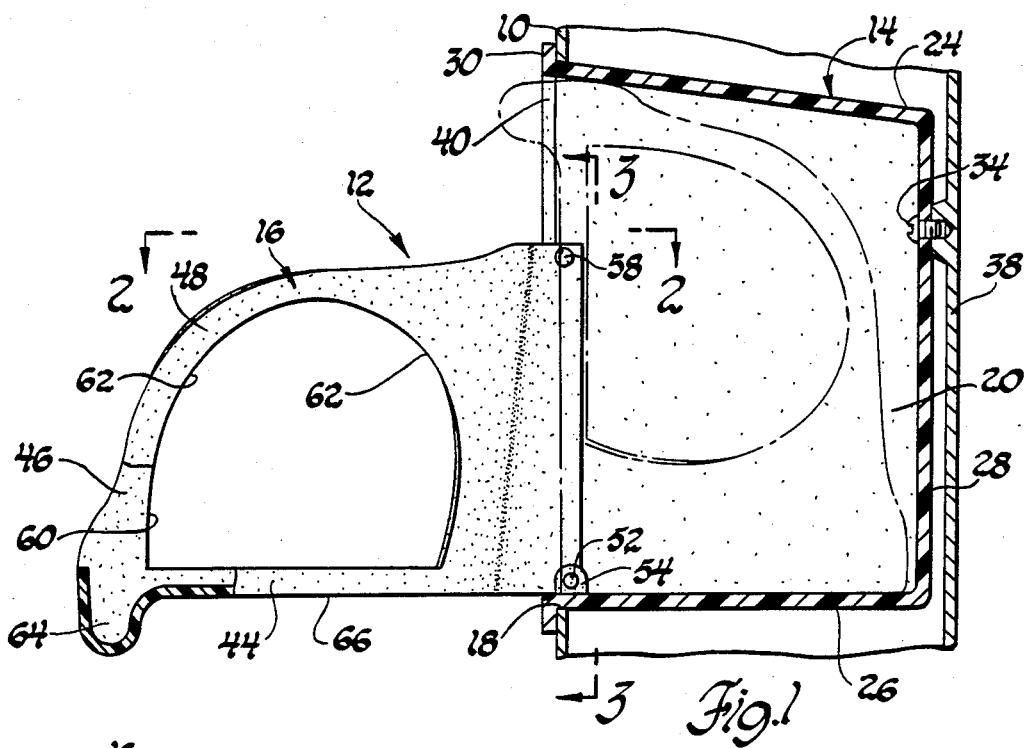
FIG. 1 is a side elevation view of a beverage holder according to the invention shown extended from the housing to a deployed position.

FIG. 1 shows a vertical extending panel 10 of the vehicle body. Panel 10 may be the vertical front face of an instrument panel, the vertical wall of a vehicle door, the vertical back surface of a vehicle seat, or some other vertical panel located conveniently adjacent a vehicle occupant. The beverage container holder 12 mounted on the body panel 10 includes a housing 14 and a beverage retainer 16.

Figure 2:
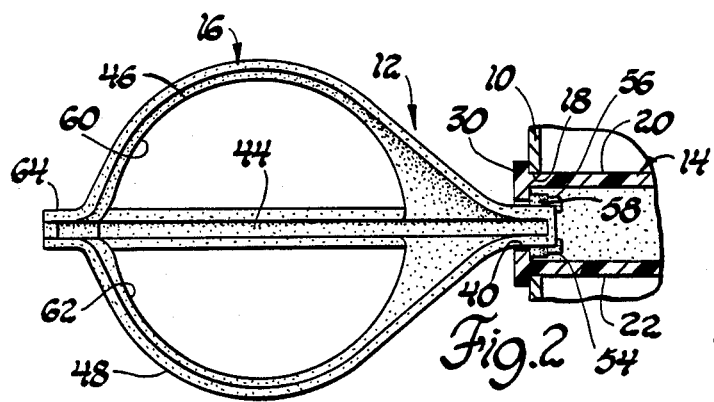
FIG. 2 is a sectional view taken in the direction of arrows 2—2 of FIG. 1.

As best seen in FIGS. 1 and 2, the housing 14 is a plastic box which is recessed into a vertical extending slot 18 of the body panel 10. The housing 14 includes spaced apart side walls 20 and 22 best seen in FIG. 2, and top wall 24, bottom wall 26, and back wall 28 best seen in FIG. 1. The housing 14 is retained in the body panel 10 by flange structure 30 provided on the walls of the housing 14 around the slot 18 of the body panel 10. Furthermore, a screw 34 attaches the back wall 28 of the housing 14 to a vehicle body panel 38 which is located behind the body panel 10. The flange 30 and side walls 20 and 22 define a narrow vertical slot 40 in the face of the housing 14.

The retainer 16 is constructed of a yieldable plastic material made through conventional plastic processing such as injection molding or vacuum forming. The retainer may be likened to a butterfly, having a spine 44 which defines a narrow shelf for supporting the bottom of the beverage container, and a pair of wings 46 and 48 which rise from the narrow shelf provided by the spine 44 to support the sides of the beverage container. The tail end of the spine 44 is pivotally mounted on the bottom wall 26 of the housing 14 by a pivot pin 52 which extends through the spine 44 and is mounted in trunnions 54 and 56 molded integrally with the bottom wall 26. The upper rear corner of the wings 46 and 48 are molded or otherwise connected together and carry a pin 58 projecting laterally therefrom to engage with the flange structure 30 of the housing 14 to position the retainer 16 at its deployed position of FIG. 1.

Figure 3:
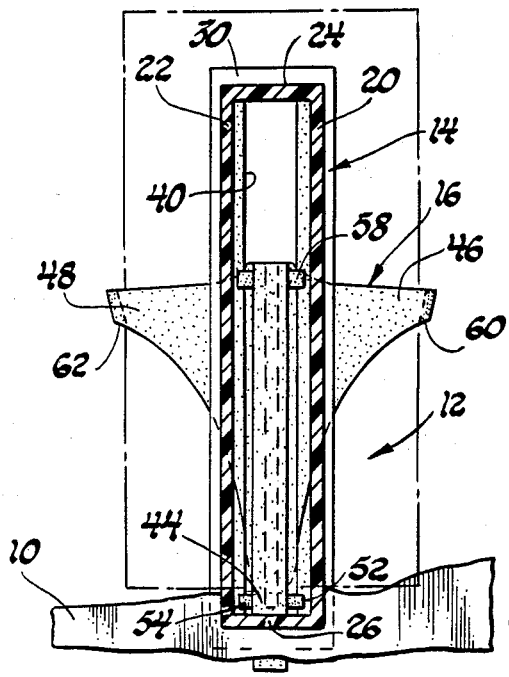
FIG. 3 is a sectional view taken in the direction of arrows 3—3 of FIG. 1.
Figure 4:
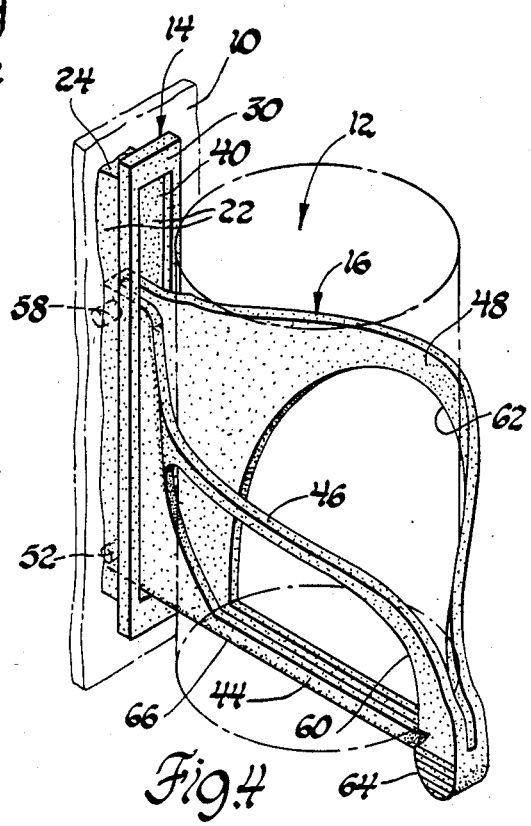
FIG. 4 is a perspective view of the beverage holder shown holding a phantom line indicated beverage can.

As best seen in FIG. 2, the wings 46 and 48 are spaced apart from each other by a distance slightly less than the diameter of the beverage container to be inserted therebetween. Furthermore, as best seen in FIGS. 1 and 3, circular openings 60 and 62 provided respectively in the wings 46 and 48 permit the beverage container to be inserted between the wings 46 and 48 so that the bottom of the container rests upon the narrow shelf defined by the spine 44. As best seen in FIG. 4, the insertion of a beverage container, such as a soda can or a coffee cup, forcibly spreads the wings 46 and 48 from their normal free state of FIG. 2, as permitted by the inherent yieldability of plastic wings 46 and 48, so that the plastic wings 46 and 48 resiliently and yieldably grip the side walls of the beverage container to effectively support and balance the beverage container upon the narrow central spine 44.

The outer end of the spine 44 carries an integral plastic molded handle 64 by which the retainer 16 may be pivoted from its deployed position of FIG. 1 to the phantom line indicated stored position of FIG. 1. This pivoting movement of the retainer 16 about its pivot pin 52 is permitted by virtue of the yieldable folding of the wings 46 and 48 closer together as they pass through the narrow slot 40 of the housing 14. When the retainer 16 is stored inside the housing 14, the wings 46 and 48 are attempting to spread apart to their free state condition of FIG. 2 and thereby frictionally bear against the side walls of the housing 14 to effectively retain the retainer inside the housing 14. Furthermore, it will be appreciated that a slot or depression may be provided in one or both of the side walls 20 and 22 to receive the wings 46 and 48 to provide a further and more positive locking relationship of the retainer at its stored position.

When the retainer 16 is in stored position indicated by phantom line in FIG. 1, the underside 66 of the spine 44 substantially closes the slot 40 of the housing 24 and preferably has a surface finish to match with the flange structure 30 on the housing 24 to provide an aesthetically pleasing appearance.

When the user wishes to return the retainer 16 to the deployed position, the handle 64 is gripped between the thumb and forefinger and the retainer 16 is pivoted outwardly of the housing to the position of FIG. 1.

Thus it is seen that the invention provides a new and improved beverage container for a vehicle body, in which the beverage container is formed of a simple and economical injection molded construction, without necessity for any operating springs, and in which the retainer is fully stored and concealed within a housing behind a vehicle body panel so that any beverage spilled upon the retainer is not visible to the vehicle passenger when the beverage holder is returned to its stored position.

The embodiments of the invention in which an exclusive property or privilege is claimed are defined as follows:

1. A beverage holder for holding a beverage container in an upright position in a motor vehicle, comprising:
    a housing adapted to be mounted on the vehicle and having spaced apart side walls defining a narrow vertical extending slot;
    and a retainer movably mounted in said housing for movement between a stored position located inside the housing and a deployed position projecting outwardly from the slot of the housing to support the bottom surface of a beverage container, said retainer having plastic wings yieldable relative one another to a spaced apart relation by which the wings resiliently cradle a beverage container inserted therebetween, said wings being further yieldable relative one another to a closely spaced relation enabling storage of the retainer between the spaced apart side walls of the housing and movement of the retainer through the slot between stored and deployed positions.

2. A beverage holder for holding the bottom surface and walls of a beverage container in an upright position on a panel in a motor vehicle, comprising:
    a housing adapted to be mounted within the panel and having spaced apart side walls defining a narrow vertical extending slot in the face of the panel;
    and a retainer movably mounted in said housing for movement between a stored position located inside the housing and a deployed position projecting outwardly from the slot of the housing to hold a beverage container, said retainer having an edge portion defining a narrow shelf for supporting the bottom of the beverage container in the deployed position and passing freely through the narrow slot defined by the housing side walls when moved to the stored position, and said retainer further having a pair of yieldable plastic wings yieldable relative one another to a spaced apart relation by which the plastic wings resiliently cradle the walls of the beverage container inserted therebetween and being further yieldable relative one another to a closely spaced relation enabling storage of the retainer between the spaced apart side walls of the housing and movement of the retainer through the slot between stored and deployed positions.

3. A beverage holder for holding the bottom surface and walls of a beverage container in an upright position on a panel in a motor vehicle, comprising:
    a housing adapted to be mounted within the panel and having spaced apart side walls defining a narrow vertical extending slot in the face of the panel;
    and a retainer mounted in said housing for movement between a stored position located inside the housing and a deployed position projecting outwardly from the slot of the housing to hold a beverage container, said retainer having a narrow shelf portion with one end pivoted to the housing at the bottom of the narrow slot and being pivotally movable between a vertical position stored inside the housing and a deployed position extending horizontally outward from the face of the panel and defining a narrow shelf for supporting the bottom surface of the container, and said retainer further having a pair of plastic support wings connected to and located above the narrow shelf portion and being yieldable relative one another to a spaced apart relation by which the wings resiliently cradle the walls of the beverage container inserted therebetween and being further yieldable relative one another to a closely spaced relation enabling storage of the retainer between the spaced apart side walls of the housing and movement of the retainer through the slot between stored and deployed positions.

* * * * *